US006239350B1

United States Patent
Sievers et al.

(10) Patent No.: US 6,239,350 B1
(45) Date of Patent: May 29, 2001

(54) INTERNAL SELF HEAT PIPING AMTEC CELL

(75) Inventors: Robert K. Sievers; Thomas K. Hunt, both of Ann Arbor; Terry J. Hendricks, Saline, all of MI (US)

(73) Assignee: Advanced Modular Power Systems, Ann Arbor, MI (US)

( * ) Notice: Subject to any disclaimer, the term of this patent is extended or adjusted under 35 U.S.C. 154(b) by 0 days.

(21) Appl. No.: 09/162,328

(22) Filed: Sep. 28, 1998

(51) Int. Cl.[7] .................................................. H01L 35/30
(52) U.S. Cl. ........................... 136/205; 429/104; 429/112
(58) Field of Search .................................. 136/205, 208, 136/209, 242; 429/5, 11, 50, 104, 112, 120

(56) References Cited

U.S. PATENT DOCUMENTS

| | | | | |
|---|---|---|---|---|
| 5,228,922 | * | 7/1993 | Sievers | 136/202 |
| 5,928,436 | * | 7/1999 | Borkowski et al. | 136/205 |
| 5,939,666 | * | 8/1999 | Sievers etal. | 136/205 |
| 5,952,605 | * | 9/1999 | Sievers et al. | 136/205 |

OTHER PUBLICATIONS

"Modular Radioisotope AMTEC Power System", Environmental Research Institute of Michigan, Sievers et al. No Month/Year Given.
"Coupled Thermal, Electrical, and Fluid Flow Analyses of AMTEC Multitube Cell with Adiabatic Side Wall", Orbital Sciences Corporation, Oct., 1997, Schock et al.
"Design and Analyses of Radioisotope Power System Based on Revised Multitube AMTEC Cell Design", Oct., 1996, Schock et al.
"Parametric Analyses of AMTEC Multitube Cells and Recommendation for Revised Cell Design", Orbital Sciences Corporation, Schock et al. No Month/Year Given.
"Design of Radioisotope Space Power System Based on Multitube AMTEC Converters", Orbital Sciences Corporation, Jan. 13, 1997, Schock et al.
"Electrode Systems and Heat Transfer in Thermoelectric Generator Design", S. Sherrit, Department of Physics, Queen's University, and M. Sayer & B. Kindi, Almax Industries Ltd. No Month/Year Given.
"Coupled Thermal, Electrical, and Fluid Flow Analyses of AMTEC Multitube Cell with Adiabatic Side Wall", A. Schock and C. Or, Orbital Sciences Corporation, and H. Noravian, Analytix Corporation No Month/Year Given.

* cited by examiner

Primary Examiner—Kathryn Gorgos
Assistant Examiner—Thomas H Parsons
(74) Attorney, Agent, or Firm—Brinks, Hofer, Gilson & Lione

(57) ABSTRACT

An alkali metal thermal to electric converter (AMTEC) cell of the type employing an alkali metal flowing between a hot end of the AMTEC cell and a cold end of AMTEC cell. The AMTEC cell being separated into a low-pressure zone and a high-pressure zone and comprising a condenser communicating with the low-pressure zone for condensing alkali metal vapor migrating through the low-pressure zone from the solid electrolyte structure, a return channel coupled to the condenser for directing the condensed alkali metal from the condenser toward the hot end of the AMTEC cell, an evaporator coupled to the return channel and communicating with the high-pressure zone for evaporating the condensed alkali metal into the high-pressure zone, the evaporator including an evaporation surface, and a solid electrolyte structure separating the low-pressure zone and the high pressure zone and having alkali metal simultaneously existing in a vapor and liquid state in its interior.

12 Claims, 4 Drawing Sheets

INTERNAL SELF HEAT PIPING AMTEC CELL

BACKGROUND OF THE INVENTION

1. Field of the Invention

The present invention relates generally to alkali metal thermal to electric converter (AMTEC) cells. More specifically the present invention relates to AMTEC cells which operate in a liquid anode condition.

2. Description of the Related Art

An AMTEC cell generally comprises a closed container separated into high- and low-pressure regions by a solid electrolyte. In the higher pressure region, alkali metal is in thermal contact with a heat source. In the lower pressure region, alkali metal is condensed by the removal of heat. During operation of the AMTEC cell, a heat source raises the temperature of the liquid alkali metal within the high-pressure zone to a high temperature and a correspondingly high vapor pressure which creates a vapor pressure differential across the solid electrolyte. The resulting electro-chemical potential difference between the regions causes migration of the alkali metal ions into the solid electrolyte with concomitant loss of electrons. These electrons flow through the external circuit and recombine with alkali metal ions passing out of the solid electrolyte at a porous electrode, neutralizing the alkali metal ions. In this way, the cell acts as a source of electrical potential for an electrical circuit. AMTEC cells deliver their electrical power to output terminals connected to positive and negative leads. The positive lead is connected to the cathode and the negative lead is usually connected to the metallic cell wall. A plurality of solid electrolyte structures may be connected in series within an AMTEC cell to increase the voltage of an AMTEC cell.

Most AMTEC cells employ at least one solid electrolyte structure in the form of a beta-alumina solid electrolyte (BASE) tube of varying geometries with the high-pressure alkali metal exposed to the BASE tube inner surface, and low-pressure alkali metal exposed to the BASE tube outer surface. The BASE tube element's inner and outer surfaces are overlaid with permeable electrodes, which are connected to each other through an external load circuit. The BASE tube provides the functions of the solid electrolyte structure discussed previously. Neutral alkali metal atoms incident on the BASE tube's inner surface give up their electrons at the anode (in this case the inner electrode). The resulting sodium ions pass through the tube wall under the applied chemical activity gradient, and the emerging alkali metal ions are neutralized at the cathode (in this case the outer electrode) by electrons returning from an external load. AMTEC cells deliver electrical power to an external load via two output terminals, a positive lead connected electrically to the cathode (outer electrode), and a negative lead, frequently connected electrically to the metallic BASE tube wall.

The neutral alkali metal vapor leaving the outer surface of the cathode electrode flows through the condenser space until it condenses at a low temperature condenser surface. The condenser transports the alkali metal condensate to an artery. From there, the alkali metal condensate flows through the artery containing a fine pore membrane consisting of a packed matrix of metal, ceramic wires, tubes or particles, similar in function to those used in heat pipe wicks. The liquid alkali metal evaporates at a high-pressure at the surface of an evaporator wick that is coupled to the artery membrane. The high-pressure alkali metal vapor is returned to the inside of the BASE tubes through a plenum at the heated end of the AMTEC cell.

Present state of the art AMTEC systems use single or multiple BASE tubes having a dry inner surface or anode. The inner surface of the present state of the art BASE tubes is maintained in a dry state due to the BASE tube's operating conditions which are designed to prevent condensation of alkali metal vapor on the BASE tube's inner surface. Liquid alkali metals are very good conductors of electrical current and create electrical shorting problems when present on the inner surface of a BASE tube. In the context of this invention description, the term "ground" is to be understood as referring to a common metallic conductor which may or may not be at the same electrical potential as the cell wall or tube support plate. The term "grounded" is to be understood as referring to the existence of a low resistance electrical connection to such a "ground". The present state of the art BASE tube is equipped to deal only with alkali metal vapor, since any liquid alkali metal present on the inner anode has the potential to short circuit to ground the inner anode by flowing into electrical contact with the tube support plate or other grounded structure in the AMTEC cell. These considerations have led to the constraint that state of the art BASE tube designs have the alkali metal on the anode side of the electrolyte be maintained only as a vapor.

Although the present design of BASE tubes makes them well suited for many applications, operating the BASE tubes with a dry or vapor anode has several disadvantages such as high contact impedance, lowered BASE power density, and the need for additional parts, adding assembly complexity. More specifically, the inner surface electrode used in state of the art vapor anode cells is a thin, sodium-permeable, metallic material applied to the inside surface of the BASE tube and brought into contact with a current collection grid. This arrangement results in less than ideal electrode performance because of the significant electrical contact resistance between the current collection grid and inner electrode on the BASE surface. The additional anode current collection grid used by a BASE tube operating with a vapor anode also leads to an increase in the number of parts and complexity of an AMTEC cell.

As mentioned previously, liquid alkali metal present on the inner surface of a BASE tube designed for operation with alkali metal vapor can cause significant electrical problems. However, the electrical characteristics of alkali metal which make it undesirable for a BASE tube operating with a dry or vapor anode can be very desirable for a BASE tube assembly designed for operation with a liquid anode. The low contact impedance, high thermal conductivity, and high latent heat of vaporization of liquid alkali metals are characteristics which may be taken advantage of by a BASE tube operating with a liquid anode, so long as the previously mentioned electrical shorting problems are overcome.

BRIEF SUMMARY OF THE INVENTION

The present invention is directed towards improving the performance of an AMTEC cell by preventing electrical shorting problems associated with an AMTEC cell operating with a liquid anode. The present invention utilizes a BASE tube operating in a liquid anode condition with novel features that prevent the liquid alkali metal from electrically shorting the BASE tube electrode to any grounded component of the AMTEC cell.

The BASE tube of the present invention employs a metal wick, in contact with or adjacent to its inner surface, which collects and holds liquid alkali metal as it condenses from the vapor state. The alkali metal condensing on the wick and contacting the surface of the BASE tube creates a liquid anode condition at the BASE tube's anode, typically the inner surface. The liquid alkali metal flows through and saturates the wick along the entire BASE tube length and circumference, bringing the wick into low impedance electrical contact with the anode and current collector bus system. The wick is preferably electrically conductive but also may comprise suitable nonconductive material. The presence of the alkali metal in the wick creates a saturated liquid condition on the inside surface of the BASE tube. Absorption of thermal energy at the BASE tube/wick interface causes saturated liquid to evaporate from the inside of the BASE tube. The evaporated alkali metal vapor then flows to the coolest part of the BASE tube (usually the end farthest from the head source) where it condenses and deposits thermal energy. This action creates a heat piping condition at and along the wick/BASE tube interface. The wick/BASE tube together then operate as a heat pipe and provide an isothermal condition along the length and circumference of the tube. This new concept is termed an Internal Self-Heat Piping (ISHP) BASE tube. Consequently, an ISHP BASE tube operating with a liquid anode in the ISHP mode may also have increased length without incurring detrimental temperature gradients. Additionally, operation with liquid alkali metal at the anode surface can provide higher power densities due to the higher density of alkali metal ion charge carriers in the liquid, relative to the vapor, thereby creating lower interfacial impedance.

The AMTEC cell of the present invention is designed to prevent the electrical shorting problems formerly associated with liquid anode operation. This is achieved primarily through two mechanisms. First, the BASE tube is positioned relative to the hot end of the cell such that the alkali metal vaporizes at the supported end of the BASE tube, thereby interrupting a potentially complete electrical path to ground. Second, the end of the BASE tube, which is mounted to the tube support plate(TSP), is attached with an intervening electrically non-conductive element making it difficult for a continuous film of liquid to exist that could electrically conduct to the support structure.

The BASE tube according to this invention is formed in two parts. The beta-alumina section is connected to an electrically non-conductive ceramic element(NCE), which in turn is mounted to the support structure. The liquid alkali metal will not completely fill the full length of the liquid anode wick since the liquid leading edge within the wick, while moving toward the heated end of the wick, will not be able to travel down the full extent of the wick. The heat transferred by the NCE coupled to the hot end region of the wick raises the local temperature above that of the remote end of the tube causing evaporation from the hot end region and preventing further liquid travel toward any metal or grounded component of the AMTEC cell. The NCE is positioned closely to the hot end of the AMTEC cell and will conduct heat to the wick and create a temperature gradient. The NCE, because of its electrical nonconductive properties, will also prevent the shorting of the liquid alkali metal to the TSP which couples thermally to the BASE tube. At the heated end of the wick the alkali metal will vaporize, set up a two-phase flow loop inside the BASE so that alkali metal condenses along the remaining portion of the wick, thereby delivering thermal energy along the BASE tube length and circumference, isothermalizing the wick and tube. The wick, NCE, and TSP are also thermally designed so that the liquid alkali metal will vaporize before touching any grounded component attached to the NCE.

The NCE can also be extended to make a secure, direct, and thermally conductive connection to the hot end of the cell. The advantage of this is to bring the NCE and BASE tube into better thermal contact with the hottest part of the cell, thereby enabling a more efficient transport of thermal energy to the BASE tube and improving its energy conversion performance. This direct thermal contact also helps the NCE evaporate liquid sodium more efficiently to keep the bottom of the NCE free of liquid sodium and electrically nonconductive.

The BASE tube is mounted to the TSP such that the NCE protrudes from both surfaces of the TSP. Thus, a liquid layer would need to be developed around the bottom edge of the tube and along its outer surface in order to complete an electrical circuit to the cell housing. The characteristics of the alkali metal liquid and the hot end temperatures and heat flow path act to make the development of such a continuous film highly unlikely.

The present invention has the advantages of a liquid alkali metal contacting the wick and BASE, leading to better electrical conduction to the BASE electrode, the capability to use longer BASE tubes, an isothermal BASE tube, higher power densities, and a small but adequate temperature gradient to prevent any liquid alkali metal from shorting the BASE tube to a grounded component.

DETAILED DESCRIPTION OF THE PREFERRED EMBODIMENT

Figure 1:
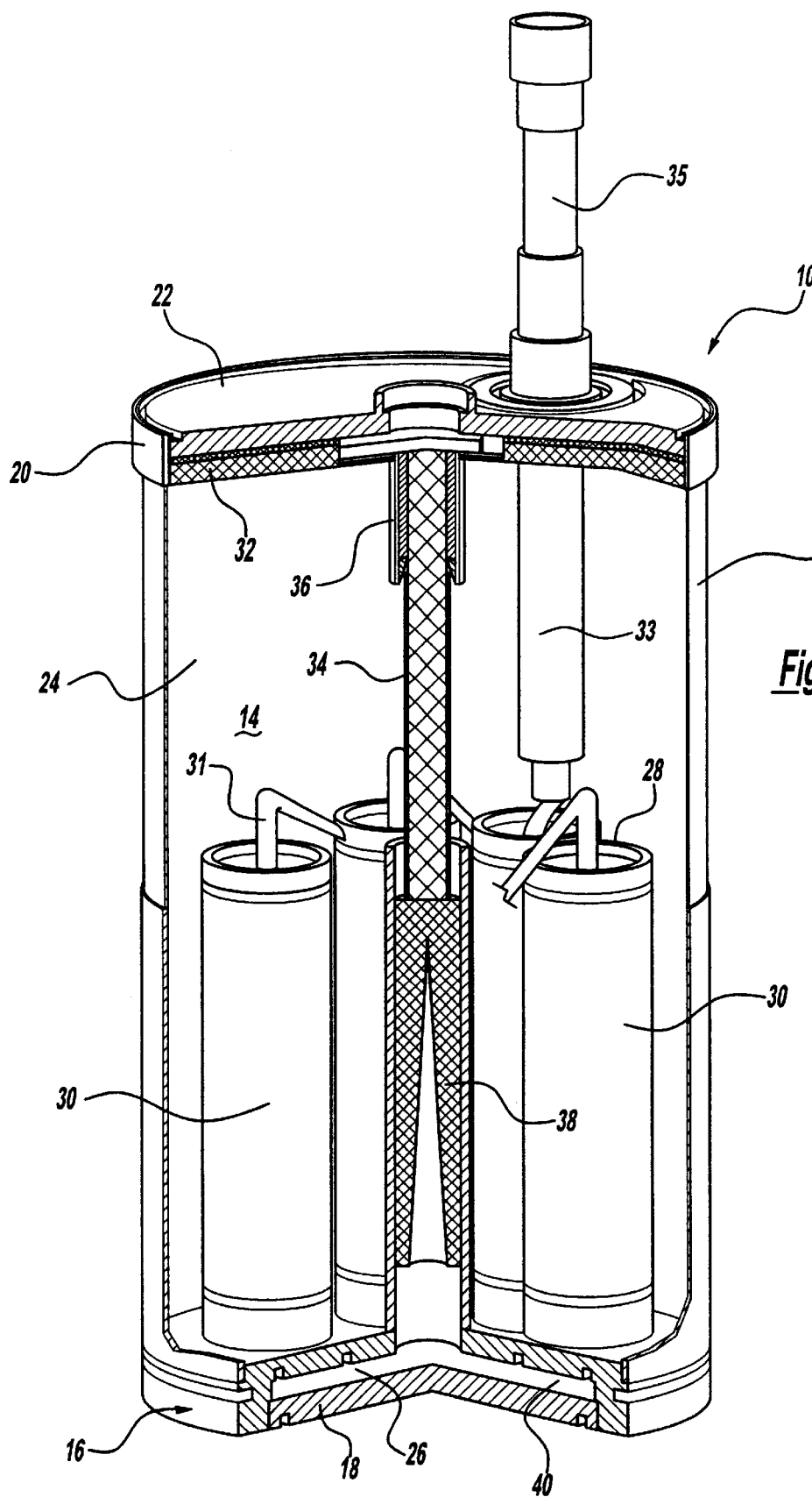
FIG. 1 is a perspective view in partial cross-section of an AMTEC cell having a BASE tube incorporating the teachings of the present invention.

FIG. 1 is a perspective view in partial cross-section of an AMTEC cell 10 incorporating the teachings of the present invention. The AMTEC cell 10 generally includes a cell wall 12 defining a chamber 14 which is closed at a first end 16 by a first end cap 18. The first end 16 is generally known in the art as the hot end of the cell 10. The chamber 14 is also closed at a second end 20 by a second end cap 22. The second end 20 is generally known in the art as the cold end of the cell.

The chamber 14 is separated into a low-pressure zone 24 and a high-pressure zone 26 by a solid electrolyte structure 28. In the illustrated embodiment, the solid electrolyte structure 28 includes a plurality of BASE tubes 30 electrically connected in series by leads 31 to increase the voltage level of the AMTEC cell 10. The leads 31 form a path to an electrical conductor 33 extending to a terminal 35 to provide access to the generated electric potential. The BASE tubes 30 are of the liquid anode type as further described below.

A condenser 32 is disposed in, and therefore communicates with, the low-pressure zone 24. As can be seen, the condenser 32 is coupled to the cell wall 12 about its periphery adjacent to the second end cap 22. An artery return channel 34 packed with metallic felt or other porous material suitable for use with liquid alkali metal is coupled to the condenser 32 by a mounting member 36. The return channel 34 extends from the condenser 32 through the low-pressure zone 24 towards the hot end 16 of the cell 10.

The return channel 34 is connected to an evaporator 38, which communicates with the high-pressure zone 26. A common plenum 40 adjacent the hot end 16 of the cell 10 interconnects the evaporator 38 and the high-pressure side of the solid electrolyte structure 28. An alkali metal working fluid, such as sodium, is disposed within the cell 10. A further description of AMTEC cells may be found in U.S. Pat. No. 4,808,240 to Robert K. Sievers, which is hereby expressly incorporated by reference herein.

In operation, neutral alkali metal atoms, which in the preferred embodiment are sodium atoms, are incident on the high-pressure side of the electrolyte structure 28 and release their electrons to the inner electrode on the electrolyte structure 28. The resulting sodium ions pass through the solid electrolyte structure 28 under the gradient of the electrochemical potential and the emerging sodium ions are neutralized at an outer electrode by electrons returning from the external load. The neutral sodium atom vapor leaving the outer electrode migrates through the low-pressure zone 24 and condenses at the condenser 32. The sodium condensate flows by capillary action through the return channel 34 to the evaporator 38. The liquid sodium evaporates at the evaporator 38 and the high-pressure sodium vapor is returned to the high-pressure side of the solid electrolyte structure 28 through the plenum 40.

Figure 2A:
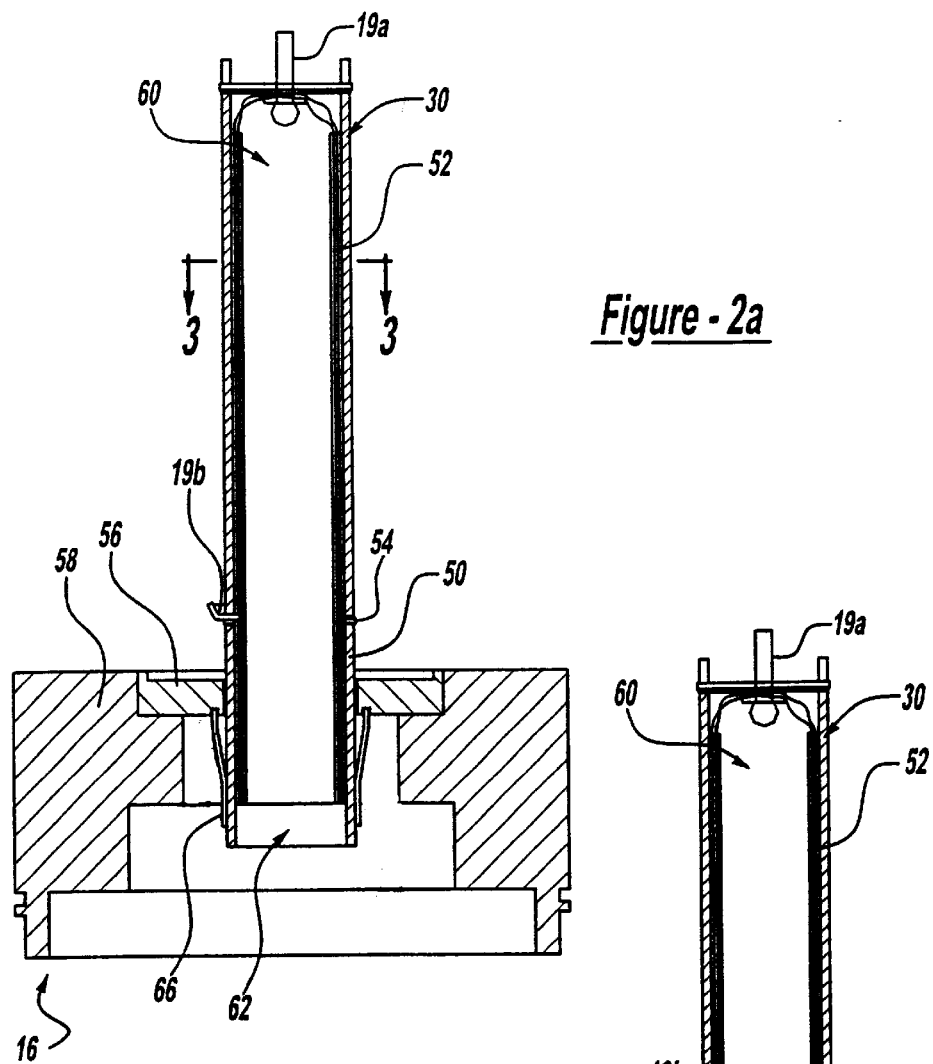
FIGS. 2a and 2b are cutaway drawings of alternate embodiments of the BASE tube of the present invention.

Referring now to the BASE tube 30, FIG. 2a is a cutaway drawing of one embodiment of the BASE tube 30 and its attachments in the present invention. The BASE tube 30 in one embodiment of this invention is a sodium beta alumina tube that may be incorporated in an AMTEC cell 10. The principle of operation of the BASE tube 30 of the present invention is based on a liquid anode rather than a vapor anode utilizing a dry inner electrode. This leads to many advantages including lower contact impedance between the liquid sodium, acting as the inner electrode, and the inner electrolyte surface, higher power density, eliminating BASE tube/evaporator temperature differences, and fewer components required in the assembly of the AMTEC cell 10.

As seen in FIG. 2a, the end of the BASE tube 30 is joined to an electrically nonconductive-ceramic element (NCE) 50 like alumina, scandia or berylia. The joint 54 between the BASE tube 30 and NCE 50 maybe be an active metal braze, a glass joint, a diffusion bond or a mechanically compressed seal. The NCE 50 extends towards and past the weld button 56 and tube support plate (TSP) 58 and, in one embodiment of the invention, comes in as close proximity as possible to the hot end 16 of the AMTEC cell 10. The outer diameter of the NCE 50 is joined to the TSP 58 via the weld button 56 and sleeve 66. Heat is conducted from the TSP 58 to the NCE 50 to vaporize the liquid sodium wicking downward onto the NCE 50. The other end of the BASE tube 30 is closed with a metal cap or other equivalent as part of the BASE tube 30 fabrication.

Figure 2B:
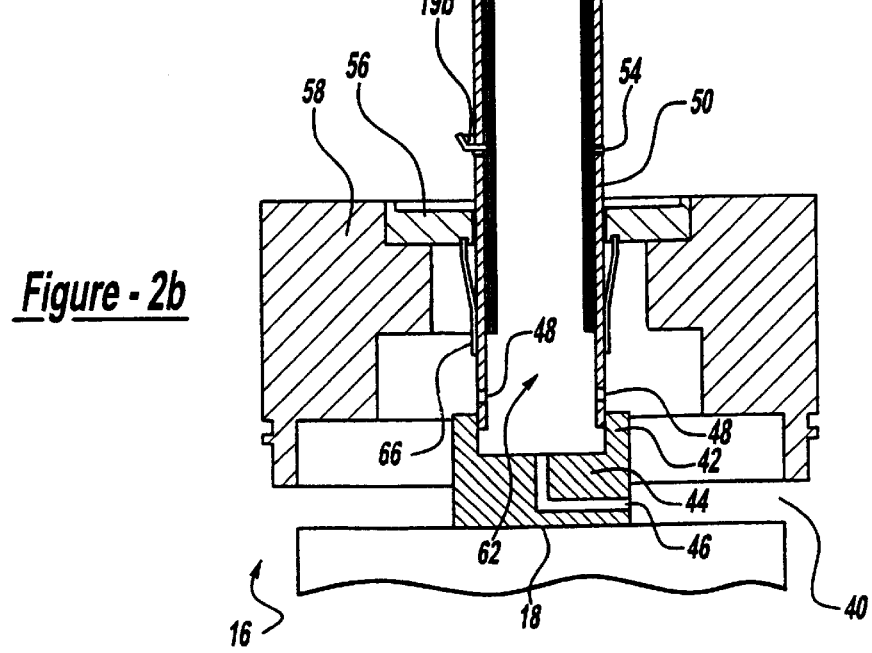

In alternate embodiments, it is also possible to consider direct thermal contact from the hot end 16 and first end cap 18 to the NCE 50. This increases the complexity, but could be done in order to position the NCE 50 in closer proximity to the hot end to aid in heat transport to the NCE 50. As seen in FIG. 2b, the NCE 50 extends downward towards an upright member 44 mounted onto the first end cap 18. The upright member 44 has a flange 42 which couples to the NCE 50 through a slipjoint, braze, screws, or any other coupling method known in the art. This embodiment utilizes the upright member 44 to conduct heat from the first end cap 18 to the NCE 50. To provide a path for the sodium vapor to flow from the common plenum 40 to the interior of the BASE tube 30 and wick 52, channels 48 are formed into the NCE 50 and/or channels 46 are formed into the upright member 44.

A cylindrical liquid anode wick 52 is installed on the inside of the BASE tube 30. The liquid anode wick 52 acts as the inner electrode and current collector. The wick 52 is electrically connected to a cap assembly 19a and/or metallic component 19b depending on the configuration of the BASE tube 30. Cap assembly 19a allows access to the output electric potential from the top of the BASE tube 30 and metallic component 19b allows access from the side of the BASE tube 30.

As seen in FIGS. 2a and 2b, the wick 52 is pinned in position by electrical leads extending out of the BASE tube 30, although any other fastening element known in the art may be used to fix the position of the wick 52 inside the BASE tube 30. The wick 52 runs the entire length of the BASE tube 30 and covers most of the NCE 50, except near the open end of the NCE 50. The wick 52 is preferably made of an electrically conductive material such as stainless steel or molybdenum but may be made from an electrically nonconductive material also. The wick 52 can consist of a wide range of mesh designs such as mesh felts or mesh metal foams having rectangular holes, cylindrical pores, or the like; porous sintered materials; grooved infrastructures with circular, rectangular, or triangular grooves; and any other material or configuration which may be wetted with liquid alkali metal, but is not limited to these stated structures. The preferred wick embodiment of the invention, for use with a cylindrical, tubular electrolyte membrane is configured with a concentric, cylindrical, porous capillary structure having pores with an average radius of 50 microns. In alternate embodiments of the present invention, one may use larger pore sizes such that the pore diameter will be larger than the distance between the wick and the inner wall of the electrolyte tubes. By keeping the pore size larger than the gap distance, the alkali metal will be preferentially drawn to the gap and hence into intimate contact with the BASE rather than collecting primarily within the capillary structure with a reduced opportunity to make contact with the BASE tube 30.

Figure 3A:
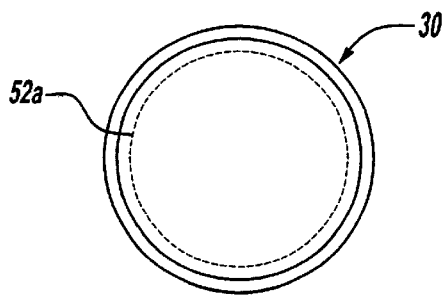
FIGS. 3a–3e are cross sections of alternate embodiments of the wick used in the present invention.

FIGS. 3a–3e illustrates the cross-sections of many wick configurations used in the present invention taken along line 3—3 in FIG. 2a. FIG. 3a depicts a simple screen mesh wick 52a wrapped around the interior circumference of a BASE tube 30. The screen mesh wick 52a is constructed from the mesh material 53b seen in FIG. 4b. The mesh material 53b is configured of a square mesh configuration having dimensions $w_4$ and $d_1$. The dimension values are determined by the operating temperatures. The wick 52a in an alternate embodiment may also be constructed from a perforated plate 53a material as shown in FIG. 4a.

Figure 3B:
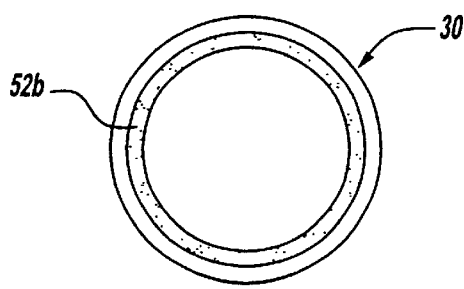
Figure 4A:
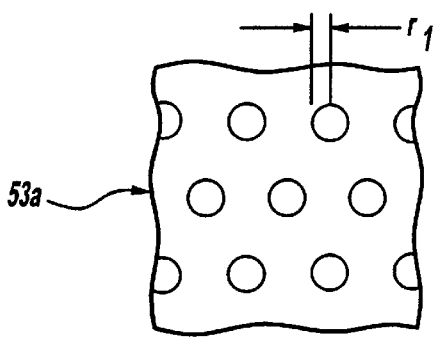
FIGS. 4a–4f are illustrations of alternate embodiments of material used to construct the wick of the present invention.
Figure 4B:
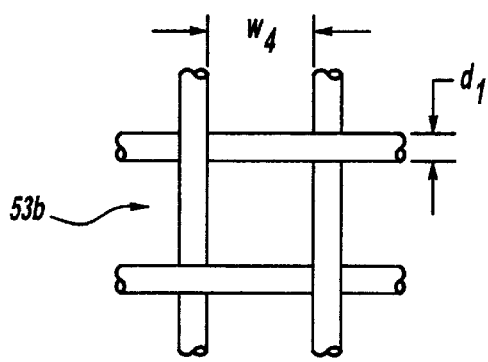
Figure 4C:
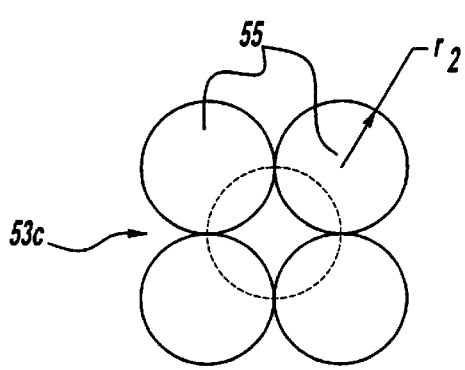

FIG. 3b depicts a wick 52b comprised of a conductive foam, a porous flexible foam, and/or a porous sintered material wrapped around the inner circumference of the BASE tube 30. As shown in FIG. 4c the porous sintered materials 53c is comprised of fine particles 55 packed in a matrix having characteristic particle dimension $r_2$.

Figure 3C:
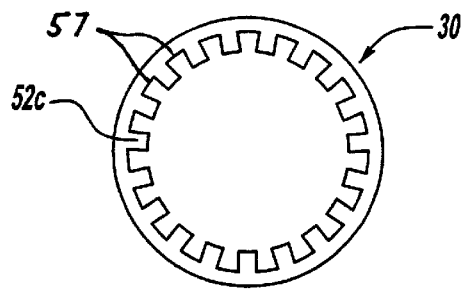
Figure 3D:
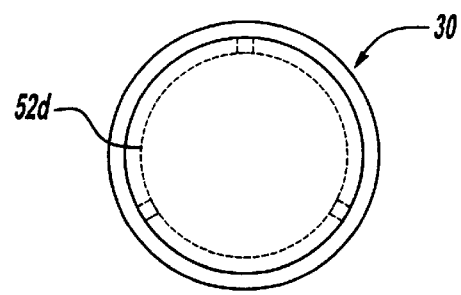
Figure 3E:
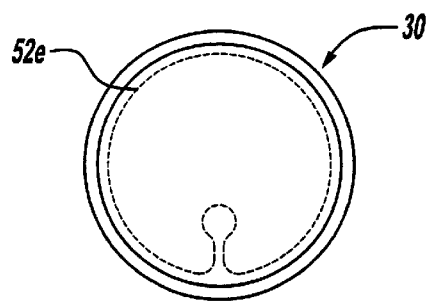
Figure 4D:
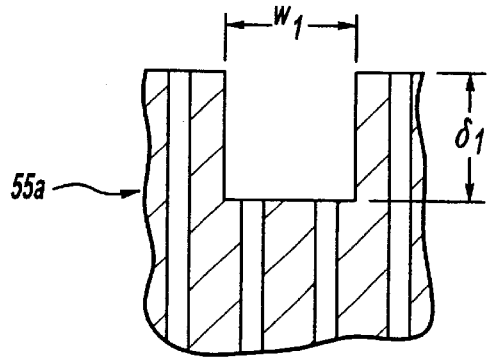
Figure 4E:
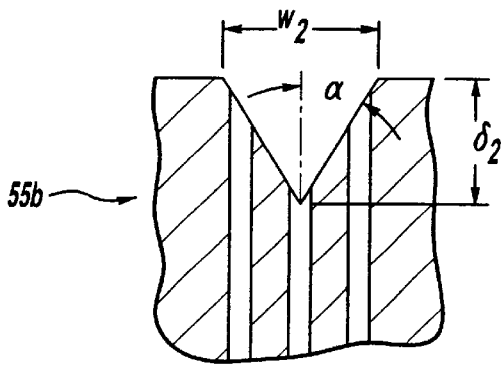
Figure 4F:
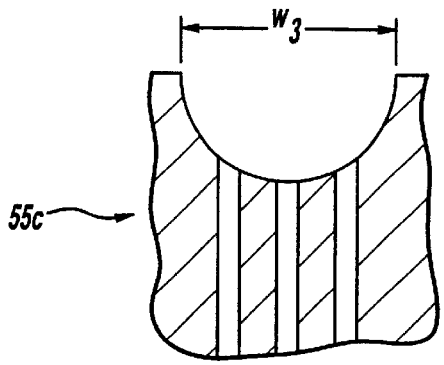

FIG. 3c depicts a wick 52c having a grooved infrastructure 57 formed on the wick 52c. The grooved infrastructure 57 comprises: a rectangular groove configuration, having a groove with dimensions $w_2$ and $\delta_1$, as shown in FIG. 4d; a triangular groove configuration, having dimensions $W_2$, $\delta_2$, and $\alpha$, as shown in FIG. 4e; a semicircular groove configuration having diameter $W_3$, as shown in FIG. 4f. In alternate embodiments other geometric shapes are used as groove shapes. The wick formed with the grooved infrastructure may be constructed from any of the previous wick materials mentioned previously and shown in FIGS. 4a–4c or other wick materials known in the art. The grooved infrastructures 55a–55c may be configured to wind helically within the interior of the BASE tube 30.

Figure 5:
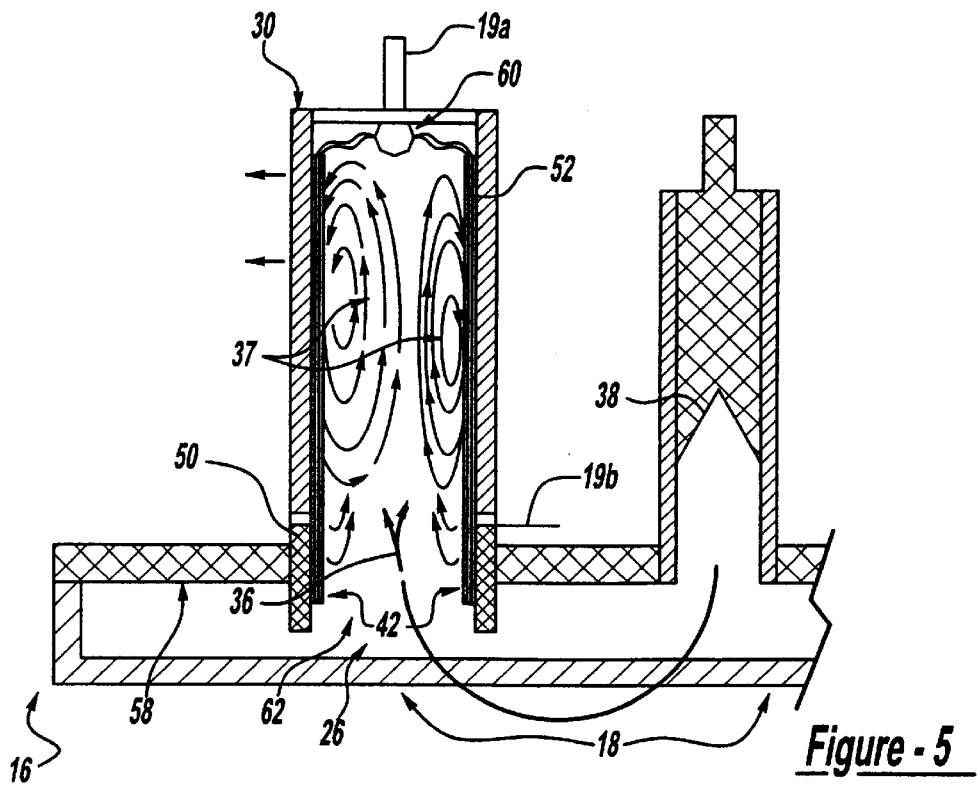
FIG. 5 is diagrammatic drawing of the BASE tube heat-piping process of the present invention.

FIG. 5 illustrates the Internal Self-Heat Piping (ISHP) liquid anode process. In operation, the liquid anode wick 52 fills with condensing sodium, symbolized by arrows 36, from the evaporator 38. When there is no sodium in the wick 52, the closed end 60 of the BASE tube 30 will be colder than the evaporator 38. This will cause the sodium to condense on the closed end 60 of the BASE tube 30 and be soaked up by the wick 52. The sodium will then be wicked toward the heated end 62 of the wick 52 overlapping the NCE 50 via capillary pressure. Heat transport to the BASE tube 30 from the cell hot end 16 will cause the sodium to evaporate from the hot end 62 of the wick 52 and condense on cooler regions including the closed end 60, depositing thermal energy and increasing the closed end 60 temperature, in an operation very similar to a heat pipe. This heat-piping action is symbolized by arrows 37 and shows the evaporation of the liquid sodium at the liquid leading edge 42, the interface between the liquid filled and no-liquid filled wick near the hot end of the BASE tube 30, and the vapor flow toward the closed end 60 of the wick 52 where the cycle begins again. This heat-piping action will isothermalize the length and circumference of the BASE tube 30 when sodium is present on the wick 52. The length of the BASE tube 30 will have only a small temperature gradient due to this heat-piping action. There is typically less than a 2° Celsius difference down the length of the BASE tube 30. It should be noted that physical state changes of the sodium, from vapor to liquid and liquid to vapor, are occurring along the entire length of the BASE tube 30. Generally at the closed end 60 of the BASE tube 30, the vapor to liquid state change is predominant and generally at the hot end 62 of the BASE tube 30, the liquid to vapor state change is predominant.

Referring to FIG. 5, as more sodium condenses, it will cover more and more of the BASE tube's 30 inner diameter, and be wicked closer and closer to the hot end 62 of the wick 52 of the BASE tube 30. More sodium will collect and the temperature of the coldest spot on the BASE tube 30 will continue to increase until it nearly matches the evaporator 38 temperature. The liquid does not completely cover the hot end 62 of the wick 52 and the liquid leading edge 42, extends into the hot end 62 just far enough to be as hot as the evaporator 38. The design is thermally tuned so that the liquid sodium does not travel to the edge of the NCE 50 where it could possibly touch a grounded component like the TSP 58. The thermal energy will either come from the TSP 58 through the NCE 50 and into the evaporation zone of the wick 52 or through thermal contacts between the NCE 50 and the hot end plate 18.

The BASE tube 30 has been described as having a generally tubularshell configuration but may assume other shapes. In alternate embodiments of the BASE tube 30 of the present invention, a corrugated shape, star shape, flat plate, shape, spherical shape, or other polygonal cross-sectional shape is considered within the scope of the invention. Increasing the number of sides and active surface area for the BASE tube 30 at which alkali metal can interface can increase the power output of the BASE tube 30.

It is to be understood that the invention is not limited to the exact construction illustrated and described above, but that various changes and modifications may be made without departing from the spirit and scope of the invention as defined in the following claims.

We claim:

1. An alkali metal thermal to electric converter (AMTEC) cell having an alkali metal flowing between a hot end of said AMTEC cell and a cold end of said AMTEC cell, said AMTEC cell being separated into a low-pressure zone including said cold end and a high-pressure zone including said hot end comprising:

a solid electrolyte structure (SES) section separating said high-pressure zone from said low-pressure zone;

a non conductive ceramic element (NCE) section coupled to said SES section, said NCE section being attached to a support Plate wherein said SES section is mounted within said AMTEC cell;

a wick disposed on said SES section and exposed to said high pressure zone for conducting said alkali metal in both liquid and vapor phases, a portion of said NCE section being free of said wick, said alkali metal exists only in the vapor phase in said portion of said NCE section free of said wick;

a condenser communicating with said low-pressure zone for condensing alkali metal vapor migrating through said low-pressure zone from said solid electrolyte structure (SES) section;

a return channel coupled to said condenser for directing said condensed alkali metal from said condenser toward said hot end of said AMTEC cell; and an evaporator coupled to said return channel and communicating with said high-pressure zone for evaporating said condensed alkali metal into said high-pressure zone, said evaporator including an evaporation surface.

2. The AMTEC cell of claim 1, wherein said solid electrolyte structure (SES) section is a beta-alumina solid electrolyte (BASE) element, said BASE element defining an interior volume exposed to said high-pressure zone and an exterior volume exposed to said low-pressure zone wherein said wick disposed within said interior volume .

3. The AMTEC cell of claim 1, wherein a first end of said wick defines a condensate end thereof and a second end of said wick defines an evaporate end thereof, said alkali metal condenses on generally said first end of said wick and travels to generally said second end of said wick where said condensed alkali metal vaporizes and generally returns to said first end of said wick, wherein a heatpiping action is generated.

4. The AMTEC cell of claim 3, wherein said condensing alkali metal isothermalizes said BASE element.

5. The AMTEC cell of claim 1, further comprising a support plate coupled to said evaporator and said NCE section.

6. The AMTEC cell of claim 1, wherein said wick comprises a mesh capable of being wetted by liquid sodium.

7. The AMTEC cell of claim 6, wherein said mesh is made from molybdenum.

8. The AMTEC cell of claim 1, wherein said wick is constructed from a material selected from the group consisting of:

metal felts;

mesh metal foams;

porous sintered materials; and grooved infrastructures.

9. A solid electrolyte structure (SES) for use in an alkali metal thermal to electric conversion (AMTEC) cell comprising:

a shell defining an interior volume exposed to a high-pressure zone, and an exterior volume exposed to a low-pressure zone, said shell is a beta-alumina solid electrolyte (BASE) element;

a wick disposed within said interior volume having a first end at a first end of said BASE element and a second end at a second end of said BASE element, wherein an alkali metal vapor condenses generally on said first end of said wick and wherein said condensed alkali metal is wicked towards said second end of said BASE element where said condensed alkali metal is generally vaporized from said wick to create a heatpiping action; and a nonconductive ceramic element (NCE) coupled to said shell said wick extending from said shell to said NCE, with a portion of said NCE being free of said wick, wherein said alkali metal exists only in the vapor phase in said portion of said NCE free of said wick.

10. The solid electrolyte structure (SES) of claim 9, wherein said condensing alkali metal isothermalizes said BASE element.

11. An alkali metal thermal to electric converter (AMTEC) cell having an alkali metal flowing between a hot end of said AMTEC cell and a cold end of said AMTEC cell, said AMTEC cell separated into a low-pressure zone including said cold end and a high-pressure zone including said hot end comprising:

a condenser communicating with said low-pressure zone for condensing alkali metal vapor migrating through said low-pressure zone from said high pressure zone a return channel coupled to said condenser for directing said condensed alkali metal from said condenser toward said hot end of said AMTEC cell;

an evaporator coupled to said return channel and communicating with said high-pressure zone for evaporating said condensed alkali metal into said high-pressure zone, said evaporator including an evaporation surface;

a support plate coupled to said evaporator;

an electrically nonconductive ceramic element(NCE) coupled to said support plate;

a beta alumina solid electrolyte (BASE) element coupled to said support plate by said NCE and separating said low-pressure zone and said high pressure zone, said BASE element defining an interior volume exposed to said high pressure zone and an exterior volume exposed to said low pressure zone, a wick disposed within said interior volume and having alkali metal in a vapor and liquid state in said interior volume, wherein alkali metal vapor condenses on a portion of said wick located generally on a first end of said BASE element and said condensed alkali metal is wicked towards generally a second end of said BASE element and another portion of said wick, where said condensed alkali metal is generally vaporized to create a heatpiping action; and said wick extending beyond said second end of said BASE element and into said NCE, a portion of said NCE being free of said wick and said alkali metal exists only in vapor phase in said portion of the NCE free of said wick.

12. The AMTEC cell of claim 11, wherein said BASE element is tubular in shape.

* * * * *